United States Patent [19]

Lasher

[11] 3,714,091
[45] Jan. 30, 1973

[54] OIL-CONTAINING POLYESTER COATING
[75] Inventor: Edward A. Lasher, Beverly Hills, Calif.
[73] Assignee: Whittaker Corporation, Los Angeles, Calif.
[22] Filed: March 22, 1971
[21] Appl. No.: 126,951

[52] U.S. Cl. .............260/21, 117/132 B, 117/161 K, 117/161 LN, 260/22 R, 260/22 M, 260/22 CQ, 260/22 XA, 260/33.4 R, 260/33.6 R
[51] Int. Cl. ..........................C09d 3/52, C09d 3/66
[58] Field of Search.....260/21, 22 R, 22 CQ, 22 XA, 260/22 M

[56] References Cited

UNITED STATES PATENTS

| | | | |
|---|---|---|---|
| 3,325,428 | 6/1967 | Graver et al. | 260/22 |
| 3,557,691 | 1/1971 | Bayer | 101/129 |
| 3,575,901 | 4/1971 | Ashjian | 260/22 |
| 3,223,658 | 12/1965 | Kraft et al. | 260/22 |
| 2,609,348 | 9/1952 | Du Puis et al. | 260/22 |
| 3,467,610 | 9/1969 | Fiarman et al. | 260/22 |

Primary Examiner—Donald E. Czaja
Assistant Examiner—Ronald W. Griffin
Attorney—Donald E. Nist and Jay H. Quartz

[57] ABSTRACT

A hard, flexible modified polyester coating is formed from a polyester resin which is made by (1) heating a mixture of a fat and a triol preferably in the presence of a catalyst until the ensuing transesterification reaction is substantially complete and (2) heating the product of (1) with a diol and a combination of aromatic and aliphatic polybasic carboxylic acids until the latter reaction is substantially complete. This polyester resin is blended with an aminoplast resin to produce a modified polyester resin composition which cures to a hard, yet flexible coating. Additional triol may be included in step (2). The weight of each of the above components in the total reaction mixture (1) plus (2) is: fat 20–25 percent; polyol 30–40 percent with the amount of triol comprising 45–70 percent of the polyol; and polycarboxylic acids - 40–56 percent with the aromatic polycarboxylic acid constituent comprising 83–92 percent of the polycarboxylic acid constituent.

10 Claims, No Drawings

3,714,091

OIL-CONTAINING POLYESTER COATING

BACKGROUND OF THE INVENTION

This invention relates to polyester resins and to paints made therefrom.

At present, it is common practice to ship metallic sheets having thicknesses less than about 0.1 inches from mills in coil form to preserve space. Some end uses of the metal sheets require coating or painting of the metal. Such coating can be performed after the metal has been sized and formed into the end product. However, this can be expensive since the coating of individual products does not lend itself to production line techniques, particularly if the product design involves complex shapes. Therefore, the coating operation is presently performed by passing the coiled metal sheet through a machine which first unwinds the coils, cleans and coats the flattened sheet, bakes the coated sheet to cure the coating and, thereafter, re-coils the coated sheet for shipment to a fabricator. The latter cuts and forms the coated metal sheeting into such diversified products as home siding, awnings, and bottle caps. The re-coiling and subsequent fabrication steps subject the coatings on the metal sheet to severe treatment including complex bending of the metal and substantial pressure, particularly when the metal is coiled.

As is apparent from the foregoing, the coating material must be hard in order to withstand high pressures without marking and it must also have sufficient flexibility to bend with the metal without cracking or peeling away from the metal. Additionally, the coating composition must be capable of being readily and uniformly applied to the metal substrate even though coil coating line conditions such as temperature, airflow and solvent concentration may change.

At present, a number of different types of compositions are available. However, each has several disadvantages and, thus, none of these compositions presently satisfies the aforementioned coating properties requirements. For example, both oil-free and dimer acid modified polyester coating compositions are available but their use is generally resisted by major coil coaters because coatings produced from these polyesters have a significant tendency to show flow patterns, crater defects and minute wrinkles. These film defects result from the high sensitivity of these polyesters to even small changes in coil coating line conditions. This sensitivity, in turn, results from the need to use strong solvents or solvent systems with these polyesters. The use of strong solvents is characterized by a significant reduction in the range of operating conditions within which satisfactory coating can be obtained. If, for example, a small amount of a strong solvent is lost due to evaporation, the polyester coating will often exhibit the aforementioned coating defects due to poor solvation. If additional solvent is used to anticipate such losses, similar defects usually result because of too low viscosity.

As used herein, the terms "strong" and "weak" solvents are used to designate hydrocarbon solvents having kauributanol values (KB values) of 90 and higher, and less than 90 and above about 70, respectively.

Although the oil-free polyester resins, in particular, exhibit satisfactory hardness and flexibility, the aforementioned application disadvantages have caused many coil coaters to use other coating compositions such as alkyd-amino and acrylic-amino compositions. However, these compositions are not completely satisfactory because they do not exhibit the requisite hardness and chemical resistance.

SUMMARY OF THE INVENTION

Polyester resins are formulated by first reacting, at elevated temperatures, a fat, e.g., a triglyceride of a fatty acid, with a triol until the resulting transesterification reaction reaches the desired stage of reaction as determined by solubility testing. The product of this reaction is thereafter reacted, at elevated temperatures, with both a diol and a polybasic carboxylic acid constituent comprising both an aromatic and an aliphatic carboxylic acid until the latter reaction is substantially complete. Additional triol may also be included in the latter step. The weight percent of each of the aforementioned components in the total reaction mixture involved in the foregoing steps is: fat — about 20 percent to about 25 percent; polyol — about 30 percent to about 40 percent with the amount of triol comprising about 45 percent to about 70 percent of the polyol; and polycarboxylic acids — about 40 percent to about 56 percent with the aromatic polycarboxylic acid constituent comprising about 83 percent to about 92 percent of the polycarboxylic acid constituent.

The polyester resin product from the foregoing reaction may be employed alone as a coating or it may be modified by blending it with small amounts, e.g., 8–20 percent by weight, of an aminoplast resin which acts as a cross-linking agent. The coatings may also be pigmented as desired.

The modified polyester coatings of this invention yield a film, when cured, that has excellent mar resistance and hardness with good flexibility. Additionally, the cured coatings are substantially free from staining by such materials as mustard, ballpoint pen ink, road tar oil, tobacco tars, tincture of iodine, and lipstick.

Furthermore, the modified polyester resins of this invention, prior to curing, are easy to handle and can be readily applied to substrates. The polyester resins are readily soluble in solvents having KB values as low as 70–75. For this reason, these resins can be readily applied to a suitable substrate, even though line conditions may change, without producing the film defects which result from use of strong solvents with prior art polyesters when the same changes in line conditions occur.

DESCRIPTION OF THE PREFERRED EMBODIMENT

All percentages used herein and in the claims are percentages by weight. Additionally, unless otherwise specified, all concentrations are given as a percent of the total reaction mixture weight employed in forming the herein-described polyester resins (excluding solvents).

In general, the herein-described polyester resins are formed by first reacting at elevated temperatures, a fat with a triol, in the presence of a catalyst, until the resulting transesterification reaction reaches the desired stage of reaction and, thereafter, reacting the resulting product with a diol and with a combination of aromatic and aliphatic polycarboxylic acids, at an elevated temperature, until the latter reaction is substantially complete. In each step, specific amounts of each of the constituents are employed in order to obtain polyester resins having substantially improved characteristics as compared with presently-employed coatings. Further improvements may be obtained by cross-linking the polyester resins formed as described above, with small amounts of an aminoplast resin.

The particular combination of components, used in the concentration ranges described herein, produces cured polyester resins which, particularly when reacted with small amounts of a cross-linking agent, are hard (2H-3aH pencil hardness), flexible (1T - 180°) and stain resistant. Additionally, the resins, prior to cure, are readily soluble in weak solvents having KB values of 70-75. If any of the components employed herein is used in concentrations outside the ranges set forth for that component or completely omitted, one or more of the foregoing characteristics will be adversely affected. This is because the particular components, in the given concentration ranges, both supplement and offset the contributions of the other components. For example, the flexibility of the cured polyester is primarily obtained from both the fat and the aliphatic polycarboxylic acid, solubility in weak solvents is primarily obtained from the fat and total polycarboxylic acid, and hardness is largely dependent upon the aromatic polycarboxylic acid. Thus, it will be understood that, by changing the amount of one component to enhance a particular characteristic, another characteristic may be adversely affected.

The polycarboxylic acid constituent employed herein is a mixture of one or more aromatic polycarboxylic acids with one or more aliphatic polycarboxylic acids. As used herein, the term "polycarboxylic acid" refers to the acids themselves as well as to the corresponding anhydrides of such acids. The aromatic polycarboxylic acids include: orthophthalic acid, isophthalic acid, terephthalic acid, tetrahydrophthalic acid, hexahydrophthalic acid and endomethylene tetrahydrophthalic acid. Halogenated derivatives of the aforementioned polycarboxylic acids and anhydrides may also be employed herein. The latter derivatives include, for example, tetrachlorophthalic acid and tetrabromophthalic acid.

The aliphatic polycarboxylic acids employed herein have from three to 18 carbons and include: malonic acid, succinic acid, glutaric acid, adipic acid, suberic acid, azelaic acid, trimethyl adipic acid, sebacic acid and dodecenyl succinic acid. Adipic acid is presently preferred because of its low cost, availability and the excellent results obtained from its use.

The concentration of the polycarboxylic acid component in the reaction mixture varies between about 40 percent and about 56 percent. Below about 40 percent, both the hardness and chemical resistance of the cured polyester resins are substantially reduced. Above about 56 percent, there is a significant loss in flexibility. That is, embrittlement occurs with the result that cracking of the coatings occurs when the underlying substrate is bent.

The concentration of the aromatic polycarboxylic acid moiety in the polycarboxylic acid mixture varies between about 83 percent and about 92 percent with the remainder of the polycarboxylic acid component being the aliphatic moiety. Below about 83 percent by weight of aromatic polycarboxylic acid, hardness is lost whereas, above about 92 percent, flexibility is lost.

The polyol derivative of this invention comprises the combination of one or more triols with one or more diols. Triols which may be used include the following: glycerine, trimethylol ethane, trimethylol propane, trimethylol butane, hexanetriol, and pentanetriol. Useful diols include the following: ethylene glycol, 1,2, and 1,3 propylene glycol, 1,3 and 1,4 butylene glycol, 1,5 pentane diol, 1,6 hexanediol, cyclohexane dimethanol, 2-ethyl,2-methyl, 1,3 propane diol, neopentyl glycol, diethylene glycol, and dipropylene glycol.

The amount of polyol employed is primarily dependent upon the amount of polycarboxylic acid in the reaction mixture. An amount of polyol is used which is sufficient to substantially completely esterify the polycarboxylic acid. If substantial amounts of polycarboxylic acid remain unreacted (with respect to the polyol), the improved hardness and flexure properties characterizing the cured resins of this invention will not be obtained. Therefore, at least a stoichiometric amount of polyol is employed. Preferably, about 20 percent excess polyol is employed. The use of higher amounts of polyol results in cured resins having relatively poorer exposure properties. In view of the foregoing, the amount of polyol varies between about 30 percent and about 40 percent.

The triol fraction of the polyol component varies between about 45 percent and about 70 percent of the weight of the polyol derivative with the remainder being diol. Below about 45 percent of triol in the polyol derivative, the cured polyester resin is characterized by being softer and having poorer chemical (stain) resistance. Above about 70 percent of triol, embrittlement occurs and the resin viscosity increases to the extent that gellation occurs before the esterification end point is reached.

The fats employed herein are usually of vegetable origin although they may be of animal origin, e.g., beef tallow. Although fish oils could be used, their odor usually precludes such use. As used herein, the term "fat" designates triesters of fatty acids, e.g., triglycerides, and includes both saturated and unsaturated types. In the latter form, they are often referred to as "oils." Any of the unsaturated fats may be hydrogenated. The term "fat" includes both naturally occurring and synthetic (synthesized from fatty acids and triols) compounds. In resin preparation, it is particularly useful to use hydrogenated or saturated fats to obtain improved color retention.

Oils which may be employed in this invention include: soyabean, safflower, sunflower, walnut, dehydrated castor, olive, peanut, raw castor, coconut, and linseed. Isomerized versions of these oils may also be employed. For example, conjugated safflower and sunflower oils may be used. Combinations of these oils may also be employed. These oils may be used in their unbodied form or the heat-bodied, unsaturated oils may be employed with Gardner-Holdt viscosities as high as Q although Gardner-Holdt viscosities of F to H are preferred. Examples of the heat-bodied oils include soyabean, safflower, sunflower, walnut, dehydrated castor and linseed oils. Both bodied and unbodied oils may be used together.

The concentration of the fat in the reaction mixture varies between about 20 percent and about 25 percent. Below about 20 percent, the uncured polyester resin is not sufficiently soluble in weak solvents to be commercially useful. Above about 25 percent, the cured polyester resin does not have sufficient hardness.

As previously mentioned, it is preferable to employ a catalyst to speed up the initial transesterification reaction without using excessively high temperatures. Useful catalysts include $Ca(OH)_2$, NaOH, KOH, LiOH and PbO.

The method employed to produce the polyester resins of this invention from the foregoing constituents is well-known in the art and will now be briefly described. The presently preferred preparation of the polyester resins involves a two step process in which the first step involves the reaction of the fat with the triol. This is accomplished by heating a first reaction mixture of the fat and triol, in the amounts previously set forth and preferably in the presence of a catalyst such as lithium hydroxide monohydrate, to a temperature preferably between about 440°F and about 480°F. The particular temperature chosen is primarily a function of the time required to complete the reaction with the reaction time decreasing with increasing temperature. Preferably, to avoid oxidation of the reactants and product, the reaction is performed in an inert atmosphere. This may be accomplished by bubbling an inert gas such as nitrogen or carbon dioxide through the reaction mixture. The reaction mixture is stirred to obtain substantially uniform mixing and is held at the elevated temperature to which it is raised until the required degree of transesterification has been reached. The degree or state of the transesterification reaction can be determined by checking the solubility of the mixture in methanol. The required degree of transesterification is obtained if one volume of the reaction mixture to a minimum of four volumes of methanol gives a clear solution at room temperature.

When the reaction is "complete," heating is discontinued and the reaction mixture is allowed to cool to a temperature which is dependent upon the operating conditions. For example, if the reaction vessel is open to the atmosphere, cooling continues until a temperature is reached at which significant oxidation does not occur. If the vessel is sealed to the atmosphere, no cooling is required. At this point, the remaining reactants, including the diol and the polycarboxylic acid, are added to the product of the first reaction mixture, preferably together with a solvent to facilitate interaction of the constituents in this second reaction mixture. Additional triols may also be added at this point. This second reaction mixture is then slowly heated to a temperature preferably between about 420°F and about 470°F and held at this temperature for a time sufficient to substantially complete the reaction. As with the first reaction, the temperature chosen for the second reaction is primarily dependent upon the time required to complete the reaction. The degree of completion of the reaction can be determined by making a 50 percent solution of the reaction solids in xylene and determining the viscosity of this solution. In general, the reaction will be substantially complete if the Gardner-Holdt viscosity of this solution is at least Q viscosity (50 percent solution in xylene) and, preferably, between S and U with an acid number preferably below 10. The resulting reaction mixture may then be thinned to a desired solids content with any appropriate solvent.

The solvents employed during the course of the reaction may include, for example, xylene, toluene, benzene and cyclohexanone. The solvents employed to thin the resulting reaction product may include, for example, any of the foregoing solvents as well as Amsco solvent D-65 with a boiling range of 158° to 185°C and kauri-butanol value of 72, Amsco solvent F with a boiling range of 183° to 206°C and a kauri-butanol value of 74, Amsco solvent G with a boiling range of 184° to 209°C and kauri-butanol value of 90, Amsco solvent HC with a boiling range of 241° to 275°C and a kauri-butanol value of 98.

The polyester resins made as described above, may be used unmodified or, preferably, modified with aminoplast resins to cause cross-linking of the polyester chains by well known methods to produce hard, yet flexible coatings. The aminoplast resins include, for example, butylated urea-formaldehyde resins, butylated melamine-formaldehyde resins, hexamethoxymethylmelamine or mixtures of various hydroxymethylmelamine-methyl ethers such as the pentamethoxymethylmelamine and the tetramethoxymethyl melamines. The hydroxymethylmelamine and hydroxymethyl ureas may also be etherified with alcohols other than methyl or butyl such as ethyl, propyl, isobutyl and isopropyl. Preferably, hexamethoxymethylmelamine alone or in combination with butylated melamine resin is employed. The amount of aminoplast employed with the polyester resin is less than about 20 percent of the weight of total resin solids in the mixture. Above about 20 percent, the cured resin is too brittle. The aforementioned preferred aminoplast resin is preferably used in the range of 8 to 14 percent of total resin solids whereas butylated melamine, which has a higher ether linkage content is used in amounts near the 20 percent limit.

This invention will now be further described by the following Examples. In each of these Examples, the term "parts" is parts by weight.

EXAMPLE 1

Polyester resins (D-G) were made using the components and concentrations shown in Table 1 and using the following procedure in each case.

To a reaction vessel which was suitably equipped with heater, inert gas connections, stirrer, thermometer and condenser, there was initially added the vegetable oil, some or all of the triol and 0.35 parts by weight of lithium hydroxide monohydrate as catalyst. In the initial mixtures for D and E, 273 parts of triol were used, for F, 293 parts of triol were used, and for G, all the triol was used. A stream of carbon dioxide gas was passed through the reaction mixture and, with stirring, it was heated to raise the reaction mixture temperature to 235°C. This temperature was held until one volume of the mixture in four volumes of methanol gave a clear solution at room temperature (indicating substantial "completion" of the transesterification reaction). Heating was then discontinued and the resulting mixture was allowed to cool to about 150°C.

When the latter temperature was reached, the diol, aromatic and aliphatic dicarboxylic acids, and any remaining triol were added. This new reaction mixture was heated slowly over a 2.5 hr. period to a maximum temperature of 235°–238°C and held at this temperature, adding additional xylene to control temperature where necessary, until a Gardner-Holdt viscosity of U was obtained for a 50 percent solution of the polyester resin in xylene. This reaction mass was then cooled and thinned to 60 percent solids in an 80/20 percent mixture of Amsco solvent G/butanol.

The viscosity and acid number of the polyester resin products D-G were measured and are set forth in Table 1.

TABLE 1

| Component or Property | Amount (parts by wt.) | | | |
|---|---|---|---|---|
| | D | E | F | G |
| Non-break soyabean oil | 510 | - | 490 | - |
| G viscosity soya-bean oil | - | 510 | - | - |
| G-H viscosity dehydrated castor oil | - | - | - | 490 |
| Trimethylol ethane | 454 | 456 | - | - |
| Trimethylol propane | - | - | 514 | 514 |
| Phthalic anhydride | 864 | 859 | 880 | 860 |
| Neopentyl glycol | 224 | 261 | 262 | 262 |
| Adipic acid | 70 | 75 | 75 | 95 |
| acid number | 8.4 | 8.9 | 9.0 | 7.2 |
| final viscosity | U | $Z^+$ | $W^+$ | $U^+$ |

Paints H-K were made from the polyester resins D-G, respectively, as follows. In each case, 11.6 parts of the polyester resin, thinned to 60 percent solids as described, was combined with 24 parts of titanium dioxide and 6.6 parts of Amsco 'G' solvent in a ball mill and blended until the desired particle size was obtained. To the resulting mixture, there was added with stirring 38.7 parts of the same polyester resin, 6.8 parts of 50 percent hexamethoxymethyl melamine, 1.5 parts of butylated melamine, 5.0 parts of Amsco solvent HC, 1.8 parts of 13 percent wax solution, 4.0 parts of Amsco 'G' solvent and 0.3 parts of 1010 catalyst (para toluene sulphonic acid — 20 percent solution in ethanol).

The resulting paints H-K were each applied to a primed aluminum panel and hardened by heating at 550°F for 1 minute. The cured paints were tested for hardness (pencil) and for chemical resistance to a 2 percent iodine solution (after 24 hrs.) and to MEK (1 min. 120 rubs). The test results are shown in Table II.

TABLE II

| Test | H | I | J | K |
|---|---|---|---|---|
| Hardness | 2H– | 2H | 2H | 2H+ |
| Chem. resistance: | | | | |
| Iodine | no stain | no stain | no stain | no stain |
| MEK | no attack | no attack | no attack | attack |

The flexibility of these paints (H-K) was also tested on thin aluminum sheet and they readily passed a 1T–180° bend without cracking. These paints therefore show that a high hardness (2H) is obtainable with excellent flexibility when employing the components and concentrations described herein.

EXAMPLE 2

Polyester resins (L-P) were made up using the procedure described in Example 1 for resin G. The particular components and concentrations employed are set out in Table 3.

TABLE 3

| Component or Property | Amount (parts by wt.) | | | | |
|---|---|---|---|---|---|
| | L | M | N | O | P |
| G viscosity soyabean oil | 490 | 490 | 490 | 490 | - |
| Raw castor oil | - | - | - | - | 490 |
| Phthalic anhydride | 860 | - | 860 | 860 | 860 |
| Iso-phthalic acid | - | 963 | - | - | - |
| 1,4 cyclohexane dimethanol | 363 | - | - | - | - |
| Neopentyl glycol | - | 433 | 262 | - | 262 |
| Diethylene glycol | - | - | - | 267 | - |
| Adipic acid | 95 | 75 | - | 95 | 95 |
| Sebacic acid | - | - | 137 | - | - |
| Trimethylol propane | 514 | 374 | 514 | 514 | 514 |
| Acid number | 9.0 | 9.5 | 7.4 | 10.2 | 9.0 |
| Final viscosity (50% in xylene) | U– | T+ | U– | V– | T– |

As will be noted from Table 3, resin L was made using 1,4 cyclohexane dimethanol as the diol rather than neopentyl glycol; resin M was made using iso-phthalic acid for the aromatic dibasic carboxylic acid component and the amount used produced a diol/triol ratio in the low end of the range required in this invention; resin N was made using sebacic acid rather than adipic acid; resin O was made using diethylene glycol as the diol component; and resin P was made using raw castor oil as the vegetable oil.

Paints (Q-U) were made up and cured using each of the resins L-P, respectively, as described in Example 1 (same component concentrations and same components except for the polyester resin). The hardness and chemical resistance of the cured paints is shown in Table 4.

TABLE 4

| Test | Q | R | S | T | U |
|---|---|---|---|---|---|
| Hardness | 2H– | H+ | 2H– | H– | H+ |
| Chem. Resistance | | | | | |
| Iodine | | no stain | | very slight stain | no stain |
| MEK | | | | no attack | |

Again, these paints were tested for flexibility and were found to readily pass a 1T–180° bend test.

EXAMPLE 3

A polyester resin (V) of this invention was made up as described for resin G of Example 1 except that G viscosity safflower oil was used in place of the G-H viscosity dehydrated castor oil of resin G. This resin (V) was then used to make a 100 lb. batch of paint using the procedure described in Example 1 but using the components and amounts shown in Table 5.

TABLE 5

| Amount | Component |
| --- | --- |
| 27.5 | Titanium dioxide (Dupont R-966) |
| 49.2 | Resin V (60% solids) |
| 3.35 | Hexamethoxymethylmelamine (X-745, 100% solids) |
| 1.12 | Butylated melamine (Plaskon 3369, 60% solids) |
| 8.52 | Amsco solvent HC |
| 8.20 | Amsco solvent G |
| 1.86 | 13% wax dispersion |
| 0.25 | 20% paratoluene sulphonic acid solution |

This paint was employed in a conventional coil coating line to coat 5010 aluminum alloy 13 in. wide × 0.019 in. thick. The paint applied well and, after curing, resulted in a high gloss film without surface defects. It had a 2H pencil hardness and its flexibility was sufficient to pass a 1-T 180° bend. In contrast to many polyester coatings cross-linked with hexamethoxymethylmelamine and catalyzed with paratoluene sulphonic acid, this paint formed very wall on the 1-T 180° bend and did not subsequently develop fissures at the bend which can curl back to produce a failure at the bend.

EXAMPLE 4

Two prior art alkyd resins, alkyd A and alkyd B, which are presently employed in coil coating applications were prepared using the procedure described in Example 1 for resin G, but using the constituents and amounts as follows: Alkyd A — the first reaction mixture consisted of 610 parts of G-H viscosity dehydrated castor oil, 475 parts of tri-methylol ethane and 0.2 parts of lithium hydroxide monohydrate. The constituents added to the first reaction product consisted of 155 parts of neopentyl glycol and 820 parts of phthalic anhydride. Alkyd B — the first reaction mixture consisted of 277.32 parts of G-H dehydrated castor oil, 315.85 parts of trimethylol propane and 0.1 part of lithium hydroxide mono hydrate. The constituents added to the first reaction product consisted of 36.97 parts of benzoic acid and 369.76 parts of phthalic anhydride.

For the alkyd A resin, the second step reaction was continued until a 50 percent solution of the alkyd resin in xylene reached a viscosity of T+. The properties, as determined in Example 1, were as follows: final viscosity — Z2; and acid number on solids — 8.0. The alkyd B second step reaction was continued until a 50 percent solution of the resin in xylene reached a viscosity of V. The properties, as determined in Example 1, were as follows: final viscosity — Z3; and acid number on solids — 8.0.

The compositions of both alkyd A and alkyd B fell outside the scope of this invention. For example, neither alkyd resin contains an aliphatic dicarboxylic acid. Additionally, the component percentages in these resins are as follows: alkyd A — oil—30 percent; polyol — 30.5 percent with the triol constituting 75 percent of the polyol; and dicarboxylic acid (only aromatic) — 40 percent. Alkyd B contains 28 percent oil, 32 percent polyol (solely triol) and 37 percent dicarboxylic acid (solely aromatic) together with 3.7 percent mono carboxylic acid.

Both alkyd A and alkyd B resins were used to make paints using the method described in Example 1 for the preparation of paint H from resin D. The particular components and concentrations employed to make the paints are set forth in Table 6.

TABLE 6

| Component | Amount (lb.) Alkyd A | Alkyd B |
| --- | --- | --- |
| Titanium dioxide | 64.24 (1.93 gal.) | 64.24 |
| Alkyd A | 23.34 (2.8 gal.) | |
| Alkyd B | | 23.34 (2.75 gal.) |
| Amsco G solvent | 12.42 (1.68 gal.) | 11.18 |
| Butanol | - | 1.24 |
| Alkyd A paste | 39.00 | - |
| Alkyd B paste | - | 37.48 |
| Alkyd A | 49.00 | - |
| Alkyd B | - | 49.6 |
| Butylated melamine (PR 269- 60% solids) | 7.70 | 7.64 |
| Amsco G solvent | 2.0 | 3.50 |
| Butanol | 1.3 | 0.24 |
| 15% wax solution | 1.0 | 1.54 |

In the procedure employed in this Example, approximately 100 lb. of each of alkyd A and alkyd B paste were made from the respective resin, $TiO_2$, Amsco G solvent and butanol but lesser amounts of these pastes were used together with the other components shown in Table 6 to make the paint formulations.

Each of the resulting paints was tested for hardness, flexibility and chemical resistance. Their pencil hardness fell in the range HB-F which is to be compared to the much higher 2H pencil hardness of the paint of this invention described in Example 3. The flexibility of the alkyd A and B paints was comparable to that obtained for the paint of Example 3. However, by lowering the hardness of the Example 3 paint of this invention, the flexibility can be made substantially superior to the alkyd A and B paints. The stain resistance of the alkyd A and B paints was generally poor as they were substantially stained by iodine, lipstick, stencil ink, road tar and mustard. In comparison, the stain resistance of the Example 3 paint of this invention was very good since it showed substantially no staining under the same test conditions.

EXAMPLE 5

This Example illustrates the solubility of the herein-described polyester resins in a low KB solvent.

A polyester resin was made up using the following constituents and amounts: non-break soyabean oil (G body) — 490 parts; trimethylol propane — 514 parts; lithium hydroxide monohydrate — 0.35 parts; neopentyl glycol — 262 parts; phthalic anhydride — 880 parts; and adipic acid — 75 parts. The procedure used was substantially the same as described in Example 1 for resin F. That is, the trimethylol propane was divided into two fractions of 293 and 221 parts and the larger fraction was reacted in a first reaction mixture with the oil and catalyst with the remaining trimethylol propane included in the second reaction mixture. The reaction was continued with the addition of xylol until a viscosity of V was obtained for a 50 percent solution of the resin in xylol. Thereafter, the reaction mass was thinned to 55 percent solids by the addition of a solvent mixture containing 92 percent by volume of a solvent (35/42) having a KB value of about 75, 2 percent Amsco B and 6 percent butanol. The latter was added primarily to obtain the desired viscosity since the resin was sufficiently soluble in the 35/42 solvent alone. The resulting resin solution had a viscosity of Z4 and an acid number of 8.0 on solids.

The resulting resin solution was employed to formulate a paint by combining 10.15 parts of this resin solution with 25.3 parts titanium dioxide and 12.2 parts Amsco G solvent in a sand mill to 7H grind. All of the resulting paste was combined with 8.32 parts of butylated melamine solution (60 percent solids), an additional 42 parts of the resin solution, 1.53 parts of Amsco G solvent, 0.5 part of wax, and 0.3 parts of 1010 catalyst.

This paint was spread over a primed aluminum sheet to obtain a dry film thickness of 0.80 mils. Spreading of the paint was smooth and showed no cratering or other defects in spite of the presence of the low KB value solvent. The pencil hardness of the cured paint was H+. It showed no effects following the previously-described iodine and MEK tests and easily passed a 1T-180° bend test. The paint of this Example was tested in Florida for exterior durability, i.e., durability to ultraviolet, temperature change, humidity and salt. Its exterior durability was excellent and was markedly superior to the prior art paints of Example 4 when subjected to the same test.

When a paint was made as described except that hexamethoxymethyl melamine was used in place of butylated melamine, an increase in hardness (2H—3H) was obtained with only a slight loss of flexibility (passed 1T—180° bend test) as compared with the paint formulated with butylated melamine. Thus, it will be understood that either the hardness or flexibility of the paint can be enhanced by selection of the aminoplast resin. In any case, the combined paint hardness and flexibility characteristics are superior to those properties of the prior art paints.

I claim:

1. The polyester resin which is obtained by heating the transesterified reaction product of (a) a fat and (b) a triol together with (c) a diol and (d) the combination of an aliphatic polybasic carboxylic acid having from three to 18 carbon atoms and an aromatic polybasic carboxylic acid, each of components (a), (b), (c) and (d) being initially present in the following weight percentages of the total weight of said components: (a) - between about 20 percent and about 25 percent; (b) plus (c) - an amount sufficient to completely esterify said (d) with said triol comprising between about 45 percent and about 70 percent by weight of said (b) plus (c); and (d) - between about 40 percent and about 56 percent with said aromatic polybasic acid comprising between about 83 percent and about 92 percent by weight of said (d).

2. The polyester resin of claim 1 wherein said (b) plus (c) is present in an amount between about 30 percent and about 40 percent by weight.

3. The polyester resin of claim 1 wherein said polybasic carboxylic acids are dibasic carboxylic acids or anhydrides thereof.

4. The polyester resin of claim 1 wherein at least one of said polybasic carboxylic acids is halogenated.

5. The polyester resin of claim 1 wherein only a portion of said triol is present in said transesterified reaction product and wherein the remainder of said triol is reacted with said transesterified reaction product and said (c) and said (d).

6. The polyester resin of claim 1 wherein said fat is selected from the group consisting of soyabean, safflower, sunflower, walnut, dehydrated castor, olive, peanut, raw castor, coconut and linseed oils and tallow.

7. The polyester resin of claim 6 wherein said triol is selected from the group consisting of glycerine, trimethylol ethane, trimethylol propane, trimethylol butane, hexanetriol and pentanetriol.

8. The polyester resin of claim 7 wherein said diol is selected from the group consisting of ethylene glycol, 1,2 and 1,3 propylene glycol, 1,3 and 1,4 butylene glycol, 1,5 pentane diol, 1,6 hexane diol, cyclohexane dimethanol, 2-ethyl, 2-methyl, 1,3propane diol, neopentyl glycol, diethylene glycol and dipropylene glycol.

9. The polyester resin of claim 8 wherein said aromatic polybasic carboxylic acid is selected from the group consisting of orthophthalic acid, isophthalic acid, terephthalic acid, tetrahydrophthalic acid, hexahydrophthalic acid, endomethylene tetrahydrophthalic acid, and wherein said aliphatic polybasic carboxylic acid is selected from the group consisting of malonic acid, succinic acid, glutaric acid, adipic acid, suberic acid, azelaic acid, trimethyl adipic acid, sebacic acid and dodecenyl succinic acid.

10. The polyester composition obtained by the reaction of the polyester resin of claim 1 with an aminoplast resin in an amount less than about 20 percent by weight of the total weight of resin solids.

* * * * *